US011319240B2

(12) United States Patent
Lambricht et al.

(10) Patent No.: US 11,319,240 B2
(45) Date of Patent: May 3, 2022

(54) GLASS FOR AUTONOMOUS CAR

(71) Applicant: AGC GLASS EUROPE, Louvain-la-Neuve (BE)

(72) Inventors: Thomas Lambricht, Perwez (BE); Yannick Sartenaer, Vedrin (BE); Quentin Fraselle, Mont Saint Guibert (BE); Nicolas Chorine, Haasrode (BE); Maxime Collignon, Gottignies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 170 days.

(21) Appl. No.: 16/497,074

(22) PCT Filed: Mar. 29, 2018

(86) PCT No.: PCT/EP2018/058176
§ 371 (c)(1),
(2) Date: Sep. 24, 2019

(87) PCT Pub. No.: WO2018/178281
PCT Pub. Date: Oct. 4, 2018

(65) Prior Publication Data
US 2021/0078293 A1 Mar. 18, 2021

(30) Foreign Application Priority Data
Mar. 30, 2017 (EP) ..................... 17163902

(51) Int. Cl.
| | |
|---|---|
| *B32B 17/10* | (2006.01) |
| *B60R 13/02* | (2006.01) |
| *C03C 3/087* | (2006.01) |
| *C03C 4/00* | (2006.01) |
| *C03C 4/10* | (2006.01) |
| *G01S 17/89* | (2020.01) |
| *G01S 17/931* | (2020.01) |
| *C03C 4/02* | (2006.01) |

(52) U.S. Cl.
CPC ........ *C03C 3/087* (2013.01); *B32B 17/10036* (2013.01); *B60R 13/02* (2013.01); *C03C 4/0092* (2013.01); *C03C 4/10* (2013.01); *B32B 17/10119* (2013.01); *B32B 2305/34* (2013.01); *B32B 2307/412* (2013.01); *B32B 2605/006* (2013.01); *B60R 2013/0287* (2013.01); *C03C 4/02* (2013.01); *C03C 2204/08* (2013.01); *C03C 2217/73* (2013.01); *G01S 17/89* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 2010/0189996 A1 | 7/2010 | Torr et al. | |
| 2015/0266489 A1* | 9/2015 | Solyom | B60W 50/029 701/23 |
| 2016/0137850 A1* | 5/2016 | Ridealgh | C08K 3/22 428/195.1 |
| 2016/0194241 A1 | 7/2016 | Lambricht et al. | |
| 2016/0214887 A1* | 7/2016 | Illy | C03C 17/2456 |
| 2016/0282155 A1* | 9/2016 | Hara | G01D 11/30 |
| 2016/0291150 A1* | 10/2016 | Hara | G05D 1/0231 |
| 2016/0304389 A1 | 10/2016 | Dogimont et al. | |
| 2016/0306030 A1* | 10/2016 | Hara | G01S 17/931 |
| 2018/0037267 A1* | 2/2018 | Williams | B60R 11/04 |
| 2018/0141858 A1* | 5/2018 | Kharchenko | C03C 23/0025 |
| 2019/0022984 A1* | 1/2019 | Labrot | B32B 17/10201 |
| 2019/0359518 A1* | 11/2019 | Lambright | C03C 3/095 |

FOREIGN PATENT DOCUMENTS

| | | |
|---|---|---|
| EP | 1 462 244 A1 | 9/2004 |
| EP | 3118174 A1 | 1/2017 |
| WO | WO 2016/202689 A1 | 12/2016 |

OTHER PUBLICATIONS

Samman et al. ("Potential Use of Near, Mid and Far Infrared Laser Diodes in Automotive LIDAR Applications," Vehicular Technology Conference Fall 2000, IEEE VTS Fall VTC2000) (Year: 2000).*
Lidar—definition of lidar by The Free Dictionary (Year: 2015).*
International Search Report dated May 14, 2018 in PCT/EP2018/058176 filed on Mar. 29, 2018.

* cited by examiner

*Primary Examiner* — David Sample
(74) *Attorney, Agent, or Firm* — Oblon, McClelland, Maier & Neustadt, L.L.P.

(57) ABSTRACT

The invention concerns a trim element for a motor vehicle comprising at least one glass sheet having an absorption coefficient lower than 5 $m^{-1}$ in the wavelength range from 1051 nm to 1650 nm and having an external and an internal faces. According to the present invention, an infrared-based remote sensing device in the wavelength range from 1051 nm to 1650 nm, is placed behind the internal face of the glass sheet.

22 Claims, No Drawings

GLASS FOR AUTONOMOUS CAR

The invention concerns a glass comprising an infrared-based remote sensing device and particularly a LiDAR sensors. More particularly, the invention concerns a glass trim element comprising new generation LiDAR sensors to be integrated in an autonomous car.

Glass trim for automotive refers to the items that can be added to the interior or exterior of an automobile to increase its appeal or to mask some unaesthetic parts of the automotive. There are several types of car trim. Some are used to protect some part of the interior or exterior vehicle from unwanted damage that can be caused by the passenger, while others are simply for aesthetics.

The most popular trim element are chrome or plastic trim. Automotive trim element may be made of vinyl, artificial leather, wood grain and leather or more generally made of plastics, polycarbonate elements. This solution is often aesthetic but does not allow adding directly some functions on the trim as such "touch screen functionalities".

However, today, more and more glass trim elements are considered in automotive field. For example such as glass trim elements are used as car trunk cover, cover for A-, B-, C-, D-pillars (vertical or near vertical supports of a car's window area—designated respectively as the A, B, C or (in larger cars) D-pillar, moving from the front to rear, in profile view) or interior trim element on the dashboard, console, door trim. Such as glass trim elements are described in patent applications EP 15 177 303.3, EP 15 177 243.1 and EP 16 160 906.0 which are integrated in the present description by reference.

The use of glass trim element in automotive field thus offers the opportunity to add some functionalities as touch functionalities which are no permitted with plastics or others classically used material.

Also, today the trend is to use more and more autonomous car to be completely used in the future. For example, futuristic autonomous car, also called driver lower car, self-driving car, robotic car, is a vehicle that is capable of sensing its environment and navigating without human input.

Autonomous vehicles detect surroundings using radar, LiDAR (acronym of Light Detection And Ranging), GPS, Odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination.

Today, autonomous cars comprise "mushrooms-like" LiDAR sensors popping up all along the car metal body. Those "mushrooms" are for example placed on the roof or on car external rear view mirrors. In addition to being unaesthetic, they are imposing and take up much space which is not in line with the expectation of car designers preparing future car design with very smooth and curvy line which are incompatible with outside sensors. LiDAR sensors may be also embedded into the bumpers or headlight systems which implies other drawbacks such a higher exposure to damage and external climatic conditions.

Thus, there is a need for an alternative to the use of imposing and unaesthetic LiDAR sensors such as "mushrooms" for autonomous cars or LiDAR on bumper.

According to the present invention, the infrared-based remote sensing device LiDAR sensors are new generation LIDAR based on scanning, rotating, flashing or solid state LiDARs and enabling 3D mapping the surroundings around the vehicle. Thus, the IR based sensor allows to make precise mapping of the surrounding of the vehicle which is used to drive correctly the autonomous car and to prevent any shock with an obstacle.

LiDAR (also written Lidar, LIDAR or LADAR) is a technology that measures distance by illuminating a target with a laser light. They are particularly scanning, rotating, flashing or solid state LiDAR. The scanning or rotating LiDARS are using moving-lasers beams while flashing and solid state LiDAR emits light pulses which reflect off objects Thus, there is a need today for infrared (IR) based remote sensing device/sensor capable of object detection and 3D mapping the surroundings around the vehicle such as LiDAR installed in the autonomous car and particularly completely integrated to the car.

Thus, solutions from prior art can not reply to requirement for

LiDAR new generation particularly because glass with integrated LiDAR was not considered as a possible solution.

Currently, there is no solution which allows IR signal to go through either the car body or glass parts such as windshield or backlite of a car with enough intensity.

Thus, the present invention proposes a solution wherein a LiDAR new generation sensor may integrated in the autonomous car combing high detection range, minimal design change and higher safety.

This solution is possible by dint of integration of a LiDAR sensor on an automotive glass trim element that exhibits a sufficient IR transmission for the sensor to operate properly. According to the present invention, the glass trim element is different than a vision glass such as windshield, sidelite. Thus the specifications and needs for a glass trim element are different than those for a vision glazing.

For simplicity, the numbering of the glass sheets in the following description refers to the numbering nomenclature conventionally used for glazing. Thus, the face of the glazing in contact with the environment outside the vehicle is known as the side 1 and the surface in contact with the internal medium, that is to say the passenger compartment, is called face 2. For a laminated glazing, the glass sheet in contact with the outside environment the vehicle is known as the side 1 and the surface in contact with the internal part, namely the passenger compartment, is called face 4.

For avoidance of doubt, the terms "external" and "internal" refer to the orientation of the glass trim element during installation in a vehicle.

Also for avoidance of doubt, the present invention is applicable for all means of transport such as automotive, train, plane but also other vehicles like drones, Thus, the present invention concerns a glass trim element for a motor vehicle comprising at least one glass sheet having an absorption coefficient lower than 5 $m^{-1}$ in the wavelength range from 1051 nm to 1650 nm and having an external and an internal faces.

According to this present invention, an infrared-based remote sensing device operating in the wavelength range from 1051 nm to 1650 nm is placed behind the internal face of the glass sheet.

According to a preferred embodiment of the present invention, the glass trim element comprises an infrared-based remote sensing device in the wavelength range from 1051 nm to 1650 nm placed behind the internal face of the glass sheet.

According to the invention, the glass sheet has an absorption coefficient lower than 5 $m^{-1}$ in the wavelength range from 1051 nm to 1650 nm. To quantify the low absorption of the glass sheet in the infrared range, in the present description, the absorption coefficient is used in the wavelength range from 1051 nm to 1650 nm. The absorption coefficient is defined by the ratio between the absorbance and the optical path length traversed by electromagnetic radiation in a given environment. It is expressed in m$^{-1}$. It is therefore independent of the thickness of the material but it is function of the wavelength of the absorbed radiation and the chemical nature of the material.

In the case of glass, the absorption coefficient (μ) at a chosen wavelength X can be calculated from a measurement in transmission (T) as well as the refractive index n of the material (thick=thickness), the values of n, ρ and T being a function of the chosen wavelength X:

$$\mu = -\frac{1}{thick} \cdot \ln\left[\frac{-(1-\rho)^2 + \sqrt{(1-\rho)^4 + 4.T^2.\rho^2}}{2.T.\rho^2}\right]$$

with $\rho=(n-1)^2/(n+1)^2$.

The glass sheet according to the invention preferably has an absorption coefficient in the wavelength range of 1051 nm to 1650 nm, generally used in optical technologies relating to the invention, very low compared to conventional glasses. In particular, the glass sheet according to the invention has an absorption coefficient in the wavelength range from 1051 nm to 1650 nm lower than 5 m$^{-1}$.

Preferably, the glass sheet has an absorption coefficient of lower than 3 m$^{-1}$, or even lower than 2 m$^{-1}$ and, even more preferably lower than 1 m$^{-1}$, or even lower than 0.8 m$^{-1}$.

A low absorption presents an additional advantage that the final IR transmission is less impacted by the optical path in the material. It means that for large field of view (FOV) sensors with high aperture angles the intensity perceived at the various angles (in different areas are the image) will be more uniform, especially when the sensor is optically coupled to the glazing.

Thus, when an autonomous vehicle encounters an unexpected driving environment unsuitable for autonomous operation, such as road construction or an obstruction, vehicle sensors through the glazing according to the invention can capture data about the vehicle and the unexpected driving environment. The captured data can be sent to a remote operator or to the central intelligence unit. The remote operator or unit can operate the vehicle or issue commands to the autonomous vehicle to be executed on various vehicle systems. The captured data sent to the remote operator/unit can be optimized to conserve bandwidth, such as by sending a limited subset of the captured data.

According to one preferred embodiment of the present invention, the glass trim element is an exterior glass trim element. More particularly, the exterior glass trim element is a glass trim element for A, B- and C-pillar or trunk cover of a vehicle.

According to another embodiment of the present invention, the exterior glass trim element may be a glass trim element disposed in the side and more particularly on the edge of on door of the vehicle.

Thus, the LiDAR may capture images and data from each sides of the vehicle.

More preferably, the autonomous car is provided with exterior glass trim according to the present invention and a glazing such as windshield, sidelites, backlites with also integrated LiDAR in order to cover all sides of the car and to map all around the car.

According to one embodiment of the present invention, the glass trim element according to the present invention may be also used to cover LiDAR which are integrated into car's bumper. Thus, the LiDAR is protected without reducing the LiDAR functionalities, performances.

According to the invention, the glass sheet is made of glass which may belong to different categories with the particularity of having an absorption coefficient lower than 5 m$^{-1}$ in the wavelength range from 1051 nm to 1650 nm. The glass can thus be a soda-lime-silica type glass, aluminosilicate, boro-silicate, Preferably, the glass sheet having a high level of near infrared radiation transmission is an extra-clear glass.

Preferably, the base glass composition of the invention comprises a total content expressed in weight percentages of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base glass composition comprises according to the invention in a content, expressed as total weight of glass percentages:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |

More preferably, for reasons of lower production costs, the at least one glass sheet according to the invention is made of soda-lime glass. Advantageously, according to this embodiment, the base glass composition comprises a content, expressed as the total weight of glass percentages:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 0-20% |
| $K_2O$ | 0-10% |
| BaO | 0-5%. |

In addition to its basic composition, the glass may include other components, nature and adapted according to quantity of the desired effect.

A solution proposed in the invention to obtain a very transparent glass in the high infrared (IR), with weak or no impact on its aesthetic or its color, is to combine in the glass composition a low iron quantity and chromium in a range of specific contents.

Thus, according to a first embodiment, the glass sheet preferably has a composition which comprises a content, expressed as the total weight of glass percentages:

| | |
|---|---|
| Fe total (expressed as $Fe_2O_3$) | 0.002-0.06% |
| $Cr_2O_3$ | 0.0001-0.06%. |

Such glass compositions combining low levels of iron and chromium showed particularly good performance in terms of infrared reflection and show a high transparency in the visible and a little marked tint, near a glass called "extra-clear". These compositions are described in international applications WO2014128016A1, WO2014180679A1, WO2015011040A1, WO2015011041A1, WO2015011042A1, WO2015011043A1 and WO2015011044A1, incorporated by reference in the present application. According to this first particular embodiment, the composition preferably comprises a chromium content (expressed as Cr2O3) from 0.002 to 0.06% by weight relative to the total weight of the glass. Such contents of chromium it possible to further improve the infrared reflection. According to a second embodiment, the glass sheet has a composition which comprises a content, expressed as the total weight of glass percentages:

| | |
|---|---|
| Fe total (expressed as $Fe_2O_3$) | 0.002-0.06% |
| $Cr_2O_3$ | 0.0015-1% |
| Co | 0.0001-1%. |

Such chromium and cobalt based glass compositions showed particularly good performance in terms of infrared reflection while offering interesting possibilities in terms of aesthetics/color (bluish neutrality to intense coloration even up opacity). Such compositions are described in European patent application No. 13 198 454.4, incorporated by reference herein.

According to a third embodiment, the glass sheets have a composition which comprises a content, expressed as the total weight of glass percentages:

| | |
|---|---|
| total iron (expressed as $Fe_2O_3$) | 0.02-1% |
| $Cr_2O_3$ | 0.002-0.5% |
| Co | 0.0001-0.5%. |

Preferably, according to this embodiment, the composition comprises: 0.06%<Total Iron≤1%.

Such compositions based on chromium and cobalt are used to obtain colored glass sheets in the blue-green range, comparable in terms of color and light transmission with blue and green glasses on the market, but with performances particularly good in terms of infrared reflection. Such compositions are described in European patent application EP15172780.7, and incorporated by reference into the present application.

According to a fourth embodiment, the glass sheet has a composition which comprises a content, expressed as the total weight of glass percentages:

| | |
|---|---|
| total iron (expressed as $Fe_2O_3$) | 0.002-1% |
| $Cr_2O_3$ | 0.001-0.5% |
| Co | 0.0001-0.5%. |
| Se | 0.0003-0.5%. |

Such glass compositions based on chromium, cobalt and selenium have shown particularly good performance in terms of infrared reflection, while offering interesting possibilities in terms of aesthetics/color (gray neutral to slight staining intense in the gray-bronze range). Such compositions are described in the application of European patent EP15172779.9, and incorporated by reference into the present application.

According to a first alternative embodiment, the glass sheet has a composition which comprises a content, expressed as the total weight of glass percentages:

| | |
|---|---|
| total iron (expressed as $Fe_2O_3$) | 0.002-0.06% |
| $CeO_2$ | 0.001-1%. |

Such compositions are described in European patent application No. 13 193 345.9, incorporated by reference herein.

According to another alternative embodiment, the glass has a composition which comprises a content, expressed as the total weight of glass percentages:

| | |
|---|---|
| total iron (expressed as $Fe_2O_3$) | 0.002-0.06%; | and one of the following components:
  manganese (calculated as MnO) in an amount ranging from 0.01 to 1% by weight;
  antimony (expressed as $Sb_2O_3$), in an amount ranging from 0.01 to 1% by weight;
  arsenic (expressed as $As_2O_3$), in an amount ranging from 0.01 to 1% by weight,
or
  copper (expressed as CuO), in an amount ranging from 0.0002 to 0.1% by weight.

Such compositions are described in European patent application No. 14 167 942.3, incorporated by reference herein.

According to the present invention, the glass sheet may be totally or partially curved to correctly fit with the particular design of the vehicle.

The glass sheet according to the invention may advantageously be chemically or thermally tempered in order to enhance the resistivity of the cover part of the exterior trim element.

The glass sheet according to the invention can have a thickness varying between 0.1 and 5 mm. Advantageously, the glass sheet according to the invention may have a thickness varying between 0.1 and 3 mm. Preferably, for reasons of weight, the thickness of the glass sheet according to the invention is from 0.1 to 2.2 mm.

According to another embodiment of the invention, the at least one trim element is made of heat treated glass sheet, for example annealed or tempered and/or bended glass sheet. Typically, this involves heating the glass sheet (coated or not) in a furnace to a temperature of at least 580° C., more preferably of at least about 600° C. and still more preferably of at least 620° C. before rapidly cooling down the glass substrate. This tempering and/or bending can take place for a period of at least 4 minutes, at least 5 minutes, or more in different situations.

According to one embodiment of the present invention, the glass sheet may comprise means to selectively filtering the infrared from sun radiation.

According to a preferred embodiment of the invention, the glass trim element is a laminated glass trim element comprising an exterior and an interior glass sheets laminated with at least one thermoplastic interlayer and wherein the exterior and an interior glass sheets are high level of near infrared radiation transmission glass sheets having an absorption coefficient lower than 5 m$^{-1}$ in the wavelength range from 1051 nm to 1650 nm.

According to the present invention, a LiDAR instrument is an optoelectronic system composed of at least a laser transmitter, at least a receiver comprising a light collector (telescope or other optics) and at least a photodetector which converts the light into an electrical signal and an electronic processing chain signal that extracts the information sought.

The LiDAR is placed on the internal face of the glass trim element (namely face 2) in case of one glass sheet trim element.

Preferably, the LiDAR is placed in a place where the LiDAR has the best angle to cover the biggest surface.

According to another embodiment of the present invention, the glass trim element is a laminated glass trim element wherein the LiDAR is placed on the internal face of the inner glass sheet namely the face 4.

Advantageously, the IR-based remote sensing device is optically coupled to the internal face of the glass trim element. For example, a soft material that fits refractive index of the glass trim element and the external lens of the LiDAR may be used.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. Such coating may be provided on face(s) 1 or/and 2 for a single glass trim element or on face(s) 1 or/and 4 for a laminated glass trim element. A textured glass sheet may be also used. Etching or coating techniques may as well be used in order to avoid reflection.

According to a preferred embodiment, the automotive equipped with a glass trim element according the present invention also comprises a glazing (windshield, sidelite, backlite . . . ) comprising an IR-based remote sensing device in order to precise mapping of the surrounding of the car which is used to drive correctly the autonomous car and to prevent any shock with an obstacle.

According to one embodiment of the present invention, the glass sheet has a value of light transmission lower than the value of infrared transmission. Particularly, according to another embodiment of the present invention, the value of light transmission in the visible range is lower than 10% and the value of near infrared transmission is higher than 50%.

According to another advantageous embodiment of the invention, the glass sheet is covered with at least one IR transparent absorbing (tinted) and/or reflecting coating in order to hide the un-aesthetic element of the sensor from the outside while ensuring a good level of operating performances. This coating may, for example, be composed of at least one layer of black ink having no (or very low) transmission in the visible optical range but having a high transparency in the infrared range of interest for the application. Such ink can be made of organic compounds as, for example, commercial products manufactured by Seiko Advance Ltd. Or Teikoku Printing Ink Mfg. Co. Ltd. that can achieve transmission <5% in the 400-750 nm range and >70% in the 850-1650 nm range. The coating may be provided on face(s) 1 or/and 2 for a single glass trim element or on face(s) 1 or/and 4 for a laminated automotive glazing, depending of its durability.

According to another embodiment of the invention, the glass sheet may be covered with a multilayer coating optimized to reflect selectively the visible range while maintaining high IR transmission. Some properties such as observed on Kromatix® product are thus sought. These properties ensure a total low IR absorbance of the complete system when such layer is deposited on adequate glass composition. The coating may be provided on face(s) 1 or/and 2 for a single automotive glazing element or on face(s) 1 or/and 4 for a laminated glass trim element, depending of its durability.

The invention claimed is:

1. A trim element for a motor vehicle comprising at least one glass sheet having an absorption coefficient lower than 5 m$^{-1}$ in the wavelength range from 1051 nm to 1650 nm and having an external face and an internal face, wherein an infrared-based remote sensing device in the wavelength range from 1051 nm to 1650 nm is placed behind the internal face of the glass sheet,
   wherein the trim element is a laminated trim element comprising an exterior glass sheet and an interior glass sheet laminated with at least one thermoplastic interlayer, wherein the exterior and interior glass sheets have an absorption coefficient lower than 5 m$^{-1}$ in the wavelength range from 1051 nm to 1650 nm and wherein the infrared-based remote sensing device is placed on an internal face of the internal glass sheet, and
   wherein the trim element is not part of an automotive windshield, sidelite, or backlite.

2. The trim element according to claim 1, wherein the trim element is an exterior glass trim element.

3. The trim element according to claim 1, wherein the absorption coefficient of the at least one glass sheet is lower than 1 m$^{-1}$.

4. The trim element according to claim 1, wherein the infrared-based remote sensing device is optically coupled to the internal face of the glazing.

5. The trim element according to claim 1, wherein the at least one glass sheet comprises a content, expressed as the total weight of glass percentages:
   total iron (expressed as $Fe_2O_3$) 0.002 to 0.06%;
   $Cr_2O_3$ 0.0001 to 0.06%.

6. The trim element according to claim 1, wherein the at least the one glass sheet comprises a content, expressed as the total weight of glass percentages:
   total iron (expressed as $Fe_2O_3$) 0.002 to 0.06%;
   $Cr_2O_3$ 0.0015 to 1%; and
   Co 0.0001 to 1%.

7. The trim element according to claim 1, wherein the at least one glass sheet comprises a content, expressed as the total weight of glass percentages:
   total iron (expressed as $Fe_2O_3$) 0.02 to 1%;
   $Cr_2O_3$ 0.002 to 0.5%; and
   Co 0.0001 to 0.5%.

8. The trim element according to-claim 1, wherein the at least one glass sheet comprises a content, expressed as the total weight of glass percentages:
   total iron (expressed as $Fe_2O_3$) from 0.002 to 1%;
   $Cr_2O_3$ 0.001 to 0.5%;
   Co 0.0001 to 0.5%; and
   Se 0.0003 to 0.5%.

9. The trim element according to claim 1, wherein the infrared-based remote sensing device is a LIDAR system based on scanning, rotating, flashing or solid state LiDARs and enabling of 3D mapping the surroundings around the vehicle.

10. The trim element according to claim 1, wherein an anti-reflective coating is provided on the surface of the automotive glazing.

11. The trim element according to claim 1, wherein at least one glass sheet is covered with at least one near-infrared transparent coating that absorbs and/or reflects the visible light.

12. The trim element according to claim 1, wherein the trim element is a cover for an A-, B-, C-, or D-pillar or a cover for trunk of a motor vehicle.

13. The trim element according to claim 1, wherein a value of light transmission of the glass sheet is lower than a value of near infrared transmission.

14. The trim element according to claim 1,
wherein the exterior and interior glass sheets have a visible light transmission value lower than 10% and a near infrared transmission value higher than 50%.

15. A trim element for a motor vehicle comprising at least one glass sheet having an absorption coefficient lower than 5 $m^{-1}$ in the wavelength range from 1051 nm to 1650 nm and having an external face and an internal face, wherein an infrared-based remote sensing device in the wavelength range from 1051 nm to 1650 nm is placed behind the internal face of the glass sheet,
wherein the trim element is a cover for an A-, B-, C-, or D-pillar or a cover for trunk of a motor vehicle,
and wherein the trim element is not part of an automotive windshield, sidelite, or backlite.

16. The trim element according to claim 15, wherein the trim element is an exterior glass trim element.

17. The trim element according to claim 15, wherein the absorption coefficient of the at least one glass sheet is lower than 1 $m^{-1}$.

18. The trim element according to claim 15, wherein the infrared-based remote sensing device is optically coupled to the internal face of the glazing.

19. The trim element according to claim 15, wherein the at least one glass sheet comprises a content, expressed as the total weight of glass percentages:
total iron (expressed as $Fe_2O_3$) 0.002 to 0.06%;
$Cr_2O_3$ 0.0001 to 0.06%.

20. The trim element according to claim 15, comprising exterior and interior glass sheets which each have a visible light transmission value lower than 10% and a near infrared transmission value higher than 50%.

21. The trim element according to claim 15, wherein the infrared-based remote sensing device is a LIDAR system based on scanning, rotating, flashing or solid state LiDARs and enabling of 3D mapping the surroundings around the vehicle.

22. The trim element according to claim 15, wherein an anti-reflective coating is provided on the surface of the automotive glazing.

* * * * *